(12) United States Patent
Chen et al.

(10) Patent No.: US 12,250,345 B2
(45) Date of Patent: *Mar. 11, 2025

(54) CENTRALIZED VALIDATION OF NETWORK CALL PARAMETERS ON DISTRIBUTED NETWORKS USING PROBABILITY MODELS

(71) Applicant: Accelitas, Inc., Petaluma, CA (US)

(72) Inventors: Yi Chen, Ann Arbor, MI (US); Gregory Morris Cote, Petaluma, CA (US); Stephen Krawczyk, Ann Arbor, MI (US); Philip George Quick, Hamilton (CA)

(73) Assignee: Accelitas, Inc., Petaluma, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/360,725

(22) Filed: Jul. 27, 2023

(65) Prior Publication Data

US 2024/0098186 A1    Mar. 21, 2024

Related U.S. Application Data

(63) Continuation of application No. 17/808,291, filed on Jun. 22, 2022, now Pat. No. 11,758,052, which is a (Continued)

(51) Int. Cl.
*H04M 3/22* (2006.01)
*H04M 3/51* (2006.01)
*H04M 7/00* (2006.01)

(52) U.S. Cl.
CPC ....... *H04M 7/0081* (2013.01); *H04M 3/5183* (2013.01); *H04M 7/0078* (2013.01)

(58) Field of Classification Search
CPC .... H04M 3/493; H04M 17/02; H04M 7/0078; H04M 7/0081; H04M 3/5183; H04Q 3/64
(Continued)

(56) References Cited

U.S. PATENT DOCUMENTS

| 5,617,470 A | 4/1997 | DePasquale |
| 7,742,591 B2 * | 6/2010 | Paek ........................ H04Q 3/64 |
| | | 379/266.01 |

(Continued)

FOREIGN PATENT DOCUMENTS

WO    WO 2019/153533 A1    8/2019

OTHER PUBLICATIONS

Check Digit Calculation Methods for Checking Account Nos. for Correctness, German Bundesbank, Jun. 2018.
(Continued)

*Primary Examiner* — Md S Elahee
(74) *Attorney, Agent, or Firm* — Knobbe, Martens, Olson & Bear, LLP

(57) ABSTRACT

Systems and methods are provided for centralized validation of potential network calls, such as calls proposing database transactions, on a distributed system. The distributed system may include multiple systems that apply independent criteria for validating proposals, which criteria may not be available external to the individual systems. Moreover, the systems may lack an ability to validate proposals prior to submitting such proposals for commitment. A centralized network call parameter validation system as disclosed herein may validate potential network calls with high confidence by applying probability models of data pattern and hashing digit checksum to potential network call parameter values, which models are generated based on statistical analysis of historical network call values.

25 Claims, 7 Drawing Sheets

Related U.S. Application Data continuation of application No. 17/808,088, filed on Jun. 21, 2022, now abandoned.

(58) Field of Classification Search
USPC .......................................................... 379/16
See application file for complete search history.

(56) References Cited

U.S. PATENT DOCUMENTS

| | | |
|---|---|---|
| 8,644,466 B1 | 2/2014 | Dawson |
| 2021/0182803 A1 | 6/2021 | Mintz et al. |
| 2022/0215292 A1 | 7/2022 | Jacobe et al. |

OTHER PUBLICATIONS

International Search Report and Written Opinion received for PCT Patent Application No. PCT/US2023/025674, mailed on Oct. 2, 2023.

* cited by examiner

CENTRALIZED VALIDATION OF NETWORK CALL PARAMETERS ON DISTRIBUTED NETWORKS USING PROBABILITY MODELS

BACKGROUND

Computing devices are widely used to exchange information between parties. Often, such exchange occurs in the form of calls over a network (a "network call"). For example, a first computing device may submit a network call proposing a data manipulation and submit the call to a second computing device, which may evaluate and accept or reject the proposed manipulation based on logic applied at the second computing device. The logic used by the second computing device is not always exposed to other computing devices, and as such it may be unclear prior to attempting a manipulation whether a given network call will succeed or fail. However, failed proposals may impose detrimental effects on a requestor. For example, a failed proposal may prevent functionality from being implemented at a requesting computing device or delay implementing such functionality. Moreover, in some cases repeated failed proposals may block a requesting computing device from submitting further proposals. For example, a second computing device acting as a proposal processor may detect repeated failed proposals and block subsequent proposals from a requesting computing device in order to prevent fraud or abuse.

The above-noted problems can be exacerbated when network calls occur in a distributed network. Illustratively, such a network may include multiple computing devices, potentially under control of multiple entities, each configured to process network calls that comply with a given proposal standard. Despite agreeing to a common standard for proposals, the logic applied at each proposal processing computing device may differ (e.g., based on state information local to that proposal processing computing device). Accordingly, it may be difficult for a computing device submitting a proposal to validate the proposal before submission, and thus avoid failed proposals and potential blocks for subsequent proposals.

DETAILED DESCRIPTION

Figure 1:
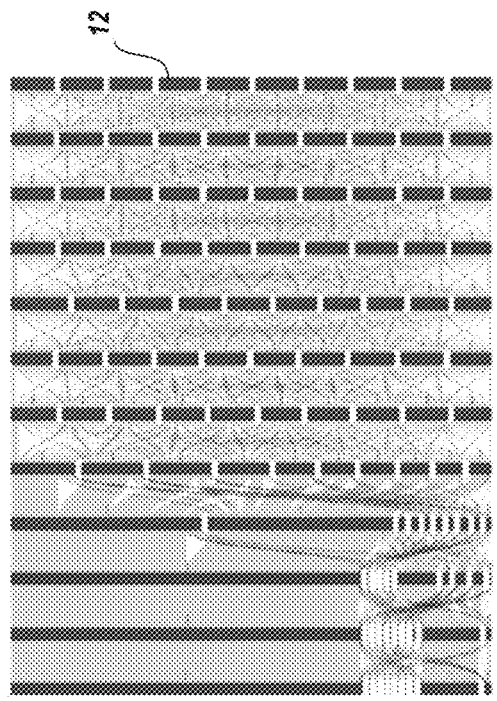
FIG. 1 provides illustrative visualizations of conditional number pattern probabilities for network call parameter values.
Figure 1:
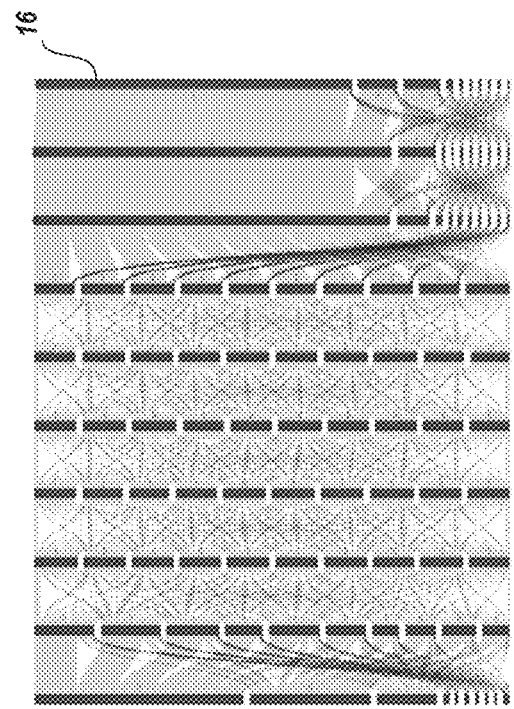
Figure 1:
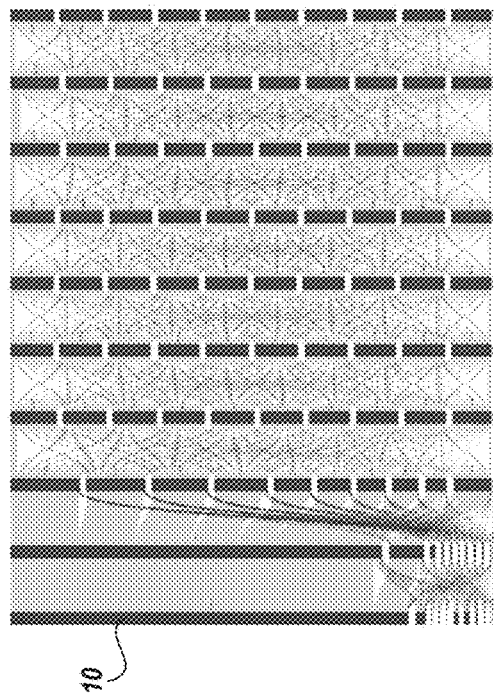
Figure 1:
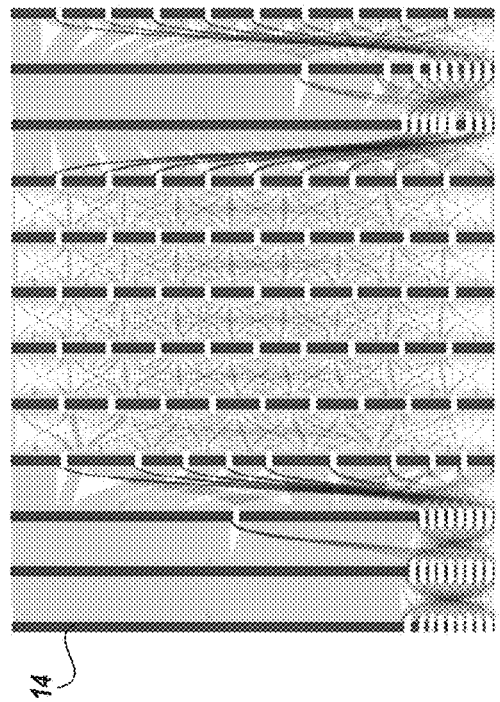

Generally described, aspects of the present disclosure relate to centralized validation of call parameters on distributed networks using statistical validity models, such as number pattern probability models, probability models of hashing digit checksum, or a combination thereof. The distributed network can include a distributed set of network computing devices, each configured to accept proposed data manipulations within the distributed networks (which data manipulations are in some cases referred to as 'transactions'). Each of the distributed set of computing devices may evaluate proposed network calls to determine whether to accept or reject such a proposal, potentially using local evaluation conditions not shared among the distributed set of computing devices. Rejected proposals may result in delayed or inhibited functionality for a proposing computing device, such as a block preventing submission of further proposals by the proposing computing device. Moreover, the distributed set of computing devices may not provide for proposal validation independent of proposing a data manipulation, leading to risk that each proposal may be rejected. Embodiments of the present disclosure address this and other problems by providing for centralized validation of network call parameters within a distributed proposal processing network. Specifically, a centralized system may generate statistical validity models, such as number pattern probability models, probability models of hashing digit checksum, or a combination thereof, denoting a likelihood of a given network call parameter value based on known (e.g., valid) network call parameters. Prior to proposing a network call to the distributed set of computing devices, a proposing computing device can submit parameters of the proposed network call to the centralized validation system to obtain a validation result indicating an expected validity (or invalidity) of the parameters. If the validation result indicates that the parameters are expected to be invalid, the proposing computing device can decline to submit the proposed network call, avoiding rejection of that proposal. If the validation result indicates that the parameters are expected to be valid, the proposing computing device can submit the proposal. Thus, the risk of rejected proposals is reduced. Moreover, the particular evaluation rules of each distributed computing device need not be disclosed to the centralized validation system, ensuring security in the distributed proposal processing network.

While a variety of network call parameters are possible, one example of a parameter that may be validated using probability models is that of account numbers. Illustratively, each entity within a distributed proposal processing network may assign account numbers to end users of that entity. To submit a proposal, the proposal may be required to include one or more account numbers to which the proposal pertains. Account numbers may be considered sensitive or confidential information, and as such each entity may assign numbers in an opaque, confidential manner. The disclosure of the number assignment mechanism may be considered a security breach. Moreover, each entity may not provide a mechanism to validate an account number outside of a proposed data manipulation, to prevent for example fraud that may occur based on a malicious party using the mechanism to locate valid account numbers. Accordingly, one mechanism for validating an account number may be to submit a proposal with the account number to the distributed network. However, failed proposals on the network may result in detrimental effects. Illustratively, network call may incur delays due to time required to submit and evaluate the proposal, and as such failed proposals may impose additional delays while the proposal is, for example, retried. In some cases, a validating entity on the network may not provide an explanation for why a proposal is rejected, which may cause the proposal to be retried and, if parameters of the proposal are unchanged, to fail repeatedly. Moreover, repeatedly failing proposals may result in blocking of the proposing party. For example, a proposing party may be blocked from submitting additional proposals on the proposal processing network if the proposing party is suspected of perpetuating fraudulent proposals.

These problems are exacerbated within distributed proposal processing networks, which may be formed from computing systems of multiple entities. Each computing system may apply a distinct set of evaluation criteria for proposals, which in some cases may vary over time. Moreover, the computing systems may have varying operational characteristics. For example, different computing systems may have different availability, with some being only transiently available (e.g., during specific hours of the day). As another example, different computing systems may have different capacities to accept network calls, with some systems being able to accept only a limited number of proposals in a given time window relative to other systems. For these reasons, even if it were possible to simply submit all proposals to a relevant system, reliance on those systems to validate individual proposals may lead to inconsistent performance of a proposing computing system. For example, such a proposing system may operate more quickly to validate proposals on some destination systems and less quickly on other destination systems, or may operate with respect to some destination systems only during certain time periods (e.g., when such destination systems are operational). As such, it may be difficult or impossible to validate proposals in real time (i.e., with little or no perceptible delay to an end user).

The above-noted problems, among others, are addressed by embodiments of the present disclosure providing for centralized validation of network call parameters. As discussed herein, a centralized network call validation system may accept parameters of proposed data manipulations and provide a validation result indicating an expected validity of the proposal parameters, if submitted to the distributed computing network. By providing for centralized validation, the issues related to differing operational characteristics of computing systems on a distributed proposal processing network are addressed. For example, embodiments of the present disclosure may enable a proposal to be validated in real time with high confidence even when a target computing system for the proposal is unavailable or operating more slowly than real-time requirements dictate. Moreover, by providing for validation independent of processing a proposal, the issues related to rejected proposals are addressed. Rather than submit proposals with invalid parameters, a submitting computing system can pre-validate those parameters, meaning that inaccurate or fraudulent proposals need never be attempted. Moreover, by use of the centralized validation disclosed herein, such a system may quickly and accurately detect fraudulent or erroneous proposals and prevent such proposals from being attempted, increasing security of the distributed proposal processing network.

As noted above, embodiments of the present disclosure can provide for centralized parameter validation by application of statistical validity models, such as probability models, probability models of hashing digit checksum, or a combination thereof to network parameter values. For example, where the proposal is a proposed transaction on the Automated Clearing House (ACH) network, the proposal may include source and destination routing and account numbers. To prevent error, fraud, or misuse, it can be important to validate all such numbers. While routing numbers are generally made public, account numbers typically are not and are instead considered private or confidential. As such, the account numbers may be assigned in an opaque and confidential manner, such that some numbers are considered valid while others are not. It can therefore be difficult for third parties—other than the entity providing the relevant account number—to validate such a number. Moreover, as noted above, the entity providing the relevant number may not make available a general system for validating account numbers, to prevent malicious use of such a system. Nevertheless, the entity may internally assign account numbers according to various criteria. Application of these criteria may lead to various patterns existing within valid account numbers, which patterns may be used in accordance with embodiments of the present disclosure to validate such account numbers. While proposals on the ACH network are used as an illustrative example, embodiments of the present disclosure are not limited to a particular type of network call. Rather, embodiments of the present disclosure may validate parameters any of a wide variety of data interactions between computing systems.

Specifically, embodiments of the present disclosure may generate, for a given set of network call parameters (such as account numbers corresponding to a given routing number), a probability model that determines the probability of an account number having certain values at some or all digit positions within the parameter. Illustratively, probabilities may be generated based on a statistical analysis of known (or expected) valid proposal parameters, such as known or expected valid account numbers. In one embodiment, such probability may include unconditional probability of a value occurring at a specific digit position within the parameter. In another embodiment, such probability may be a conditional probability of a value occurring at a specific digit position given the digit at another position (or other positions) within the parameter. For example, the unconditional probability may denote a probability of a "5" occurring at the second digit of a number, while the conditional probability may denote a probability of a "5" occurring at the second digit given that a "3" occurs at the first digit. Both unconditional and conditional probabilities may be determined, for example, based on instances of the combination of digits within a historical corpus of proposal parameters (e.g., a percentage of expected valid parameters that have had a "3" in the first digit, or a percentage of expected valid parameters that have had a "3" in the first digit and "5" in the second digit, given all expected valid parameters with a "3" in the first digit). As disclosed below, a probability models may be applied to a proposal parameter value to determine the probability of that parameter being valid.

FIG. 1 provides illustrative visualizations of probabilities for network call parameter values. Specifically, FIG. 1 depicts four Sankey diagrams 10-16, each depicting conditional number pattern probabilities of a different set of network call parameter values, such as account numbers corresponding to different computing systems in a distributed proposal processing network. In FIG. 1, the visualized probabilities are conditional probabilities; however, embodiments of the present disclosure may additionally or alternatively utilize statistical models based on unconditional probability. Each column of each diagram represents a position within the network call parameter values. While each diagram in FIG. 1 depicts parameters of length 10 (e.g., 10 positions), other parameter lengths are possible. In FIG. 1, divisions within each column illustratively represent consecutive Arabic numerals 0-9, with a top portion of each column representing 0, a next portion representing 1, etc. Thus, each column depicts a probability of a parameter having a given numeral at the given position. While Arabic numerals are used for illustration, other symbol sets may be used, including alphabetical characters or alphanumericals. Further, in FIG. 1 the connections between columns in each diagram show a conditional probability of a value at a position given a value of an adjacent position. Accordingly, in diagram 10, parameter values typically begin with a 0 (as the top portion occupies a majority of the column). Moreover, for parameters with a 0 in the first position in diagram 10, there is a high probability that the parameter also has a 0 at the second position, as the connection between the top portion of the first column and the top portion of the second column is thicker than other connections. In contrast, for parameters with a 0 in the first position in diagram 10, there is a relatively smaller probability that the number 1 occurs at a second position, as shown by the relative thickness of the connection between these positional values in diagram 10. There is similarly a very small relative probability that the number 2-9 occur at a second position for parameters with a 0 in the first position in diagram 10. The conditional probability for each other pair of positions can be similar seen in diagram 10. Similarly, diagrams 12-16 depict conditional number pattern probabilities generated from other sets of network call parameter values.

As noted above, each of the diagrams 10-16 may illustratively be generated based on analysis of a set of historical network call parameter values, which may be known or expected to be valid. Thus, each diagram 10-16 can represent aggregate probabilities derived from the set of values.

In one embodiment, a centralized validation system determines the expected validity of a network call parameter value based on the conditional number pattern probabilities determined from historical network call parameter values, as represented in diagrams 10-16. For example, the centralized validation system may determine that a network call parameter value is expected to be valid if it follows a pattern commonly represented in the historical values, and thus having a high probability according to the diagrams 10-16, and similarly may determine that a network call parameter value is expected to be invalid if it follows a pattern not commonly represented in the historical values, thus having a low probability according to diagrams 10-16. As an illustration, the probability of a specific network call parameter value v of length l may be modeled as a function of the probability of a symbol occurring at a first position and the conditional probability of the symbol at each subsequent position, e.g., according to the equation:

$$P(v) = \text{func}(P(a_1), \Pi_{i=1}^{l-1} P(a_{i+1}|a_i)) \quad (1)$$

where:
i is the ith most significant position of the parameter value, with significance for the purposes of equation (1) corresponding to its position within the value v;
$P(a_i)$ represents the probability of the symbol a at position i; and
$P(a_i|a_j)$ represents the conditional probability of a at position i given a at position j.

The function may illustratively be a multiplication of the function's parameters normalized to provide a probability value between 0 and 1, though other functions are possible. In some cases, the probability may be further modified based on other attributes of the network call parameter. For example, where a certain network call parameter is probabilistically determined to take on certain characteristics (such as values within one or more ranges or having one or more given lengths), the above probability may be multiplied by the probability of the value v given those characteristics. Illustratively, where a probability is determined for each of a number of value lengths, the probability may be modeled as:

$$P(v) = \text{func}((P(a_1), \Pi_{i=1}^{l-1} P(a_{i+1}|a_i)), P(l)) \quad (2)$$

where P(l) represents the probability of a value of length l. Similar modifications may be made to account for probabilities of a given range of values or the like.

In some embodiments, the probability of a given network call value may be based on a conditional number pattern probability for less than all positions within a network call parameter value. For example, it may be that a strong pattern exists with respect to some positions, but a weak pattern (or no pattern) exists with respect to other positions. Illustratively, in diagrams 10-16, it can be seen that a strong pattern exists with respect to positions one and two of diagram 10, with respect to positions 1 through 4 of diagram 12, with respect to positions 1-3, 8, and 9 in diagram 14, and with respect to positions 1 and 8-10 in diagram 16. Any of the above equations may thus be modified to account for the conditional probabilities of just these positions. For example, equation (2) may be modified as:

$$P(v) = \text{func}((P(a_1), \Pi_{i \in X} P(a_{i+1}|a_i))) \quad (3)$$

where:
X is the set of positions i contributing to the probability;
$P(a_i)$ represents the probability of the symbol a at position i; and
$P(a_i|a_j)$ represents the conditional probability of a at position i given a at position j.

The strength of a pattern at a given position may be evaluated based on various criteria. For example, the strength of a pattern may be inversely proportional to the entropy at the position, calculated as a function of the probability distribution at that position. Accordingly, positions with a relatively even probability distribution may be said to have high entropy, and positions with a relatively uneven probability distribution may be said to have low entropy. In one embodiment, a threshold entropy level may be set, and probabilities may be calculated on the basis of positions with entropy less than the threshold level. Equation (3) may further be modified to include probabilities based on other attributes of the parameters, such as by multiplying according to a length probability as in equation (2).

As discussed herein, a centralized network call parameter validation system may utilize one or more of the above-noted techniques to calculate a probability that a given proposed network call parameter value is valid. Accordingly, when a proposed network call parameter is submitted to the centralized network call parameter validation system, the centralized network call parameter validation system may determine a probability that the proposed network call parameter is valid and return a validation result based on that probability. In one case, the validation result is the determined probability. In another case, the validation result may be derived based on the determined probability. For example, the centralized network call parameter validation system may be associated with a pre-defined threshold and return a positive validation result if the probability exceeds the threshold or a negative validation result if the probability does not exceed the threshold.

As noted above, multiple probability models may be used based on other attributes of a proposed network call. For example, where the parameter to be validated is an account number, a distinct probability model may be determined for each of a set of routing numbers, as different entities associated with different routing numbers may assign account numbers in different ways.

In some cases, additional or alternative algorithms may be applied to calculate the probability that a proposed network call parameter value is valid. For example, some types of parameter values (such as account numbers) may be generated based at least partly on hashing or checksum algorithms. The particular algorithm may be confidential to an entity generating the parameter values. However, a centralized network call parameter validation system may apply statistical techniques to determine a probability that a network call parameter value is valid based on an expected distribution of the checksum of hashing digit value(s) and the rest of the network call parameter values. Illustratively, for a given set of parameter values (e.g., account numbers corresponding to a given routing number), the centralized network call parameter validation system may generate a number of different probability distributions by applying a set of known checksum or hashing algorithms (or variations of a given algorithm, such as with different weights) to the values, each algorithm resulting in a probability distribution for the checksum of hashing digit value(s) and the rest of the network call parameter values.

As an illustration, consider a nine-digit numerical number. One possible hashing algorithm may include multiplying each digit of the first 8 digits by a set of weights (e.g., eight weights, with one weight for each of the 8 digits), adding all the resulting values together, and setting the ninth digit as the distance between the sum of all products and the next highest number divisible by 10. For example, if the first eight digits were 78945612 and the weights were {3, 7, 1, 3, 7, 1, 3, 7}, the sum of all products would be 156. The next highest number divisible by 10 would be 160, resulting in an ending digit of 4 (160-156). While this describes one possible hashing algorithm, a variety of other such algorithms are possible and various examples of such algorithms are known in the art.

While the centralized network call parameter validation system may not have knowledge of the particular checksum or hashing algorithm used to generate the hashing digit(s) of a network call parameter value, the centralized network call parameter validation system may apply a possible checksum or hashing algorithm to a set of historical parameter values and compare the result of each resultant digit value to an expected value that is based on the algorithm. For example, where the algorithm generates an ending digit for a parameter value, the expected value may be the value of the ending digit in an input parameter value. Where a checksum or hashing algorithm generates a specific value, such as 0, the expected value may be that specific value. Illustratively, applying the algorithm and weights above to the number 789456124 may result in a deviation of 0 from the expected value, as the result of the algorithm is 4 and 4 is the expected value indicated by the ending digit of the value. Similarly, applying the algorithm and weights above to the number 789456120 would result in a deviation of 4, as the result of the algorithm is 4 and the expected value (e.g., the ending digit of the value, as the checksum or hashing algorithm is expected to generate that ending digit) is 0. Repeated application of the checksum or hashing algorithm to various historical values can result in a distribution of value deviations. If that distribution is relatively peaked (as opposed to flat), this can indicate that the checksum or hashing algorithm—or a variation thereof—was used to generate the historical values. Accordingly, subsequent application of the algorithm may be used to validate proposed network call parameter values.

Figure 2:
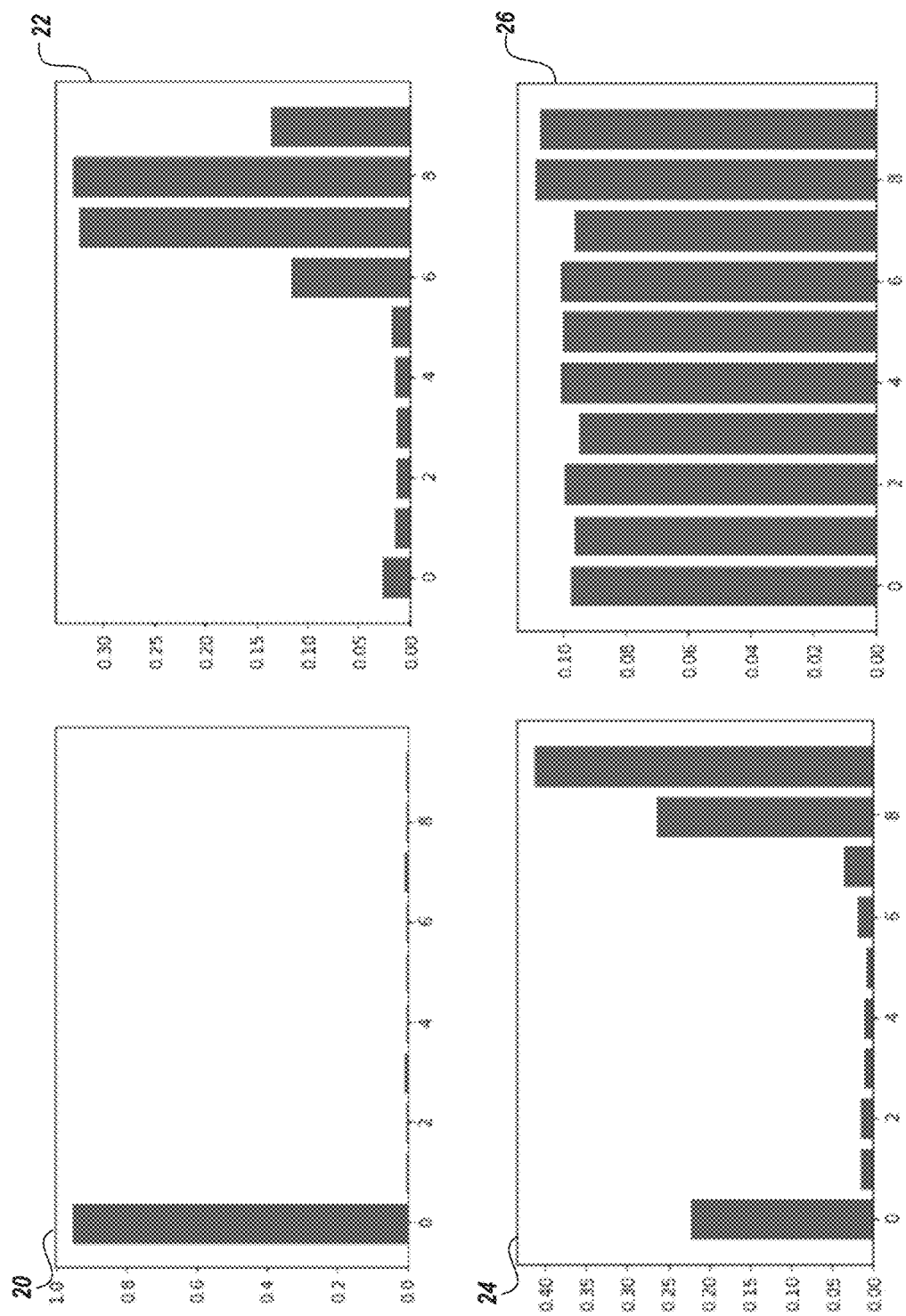
FIG. 2 provides illustrative examples of deviation distributions for checksums of network call parameter values.

Illustratively examples of deviation distributions are shown in FIG. 2 as distributions 20-26. Each distribution may be generated by passing a set of historical network call parameter values through a checksum or hashing algorithm (and associated parameters, such as weights) and determining a deviation between the calculated and expected results for the algorithm. For example, the distributions 20-26 may be generated for a given set of historical values by applying different algorithms, or different weights for the same algorithm, to those values. As can be seen in FIG. 2, the peakedness of each distribution varies, with distribution 20 showing a single strong peak at 0, distributions 22 and 24 showing a set of moderately strong peaks (at 6-9 for distribution 22 and 0, 8, and 9 for distribution 26), and distribution 26 showing little peakedness (being relatively flat). The peakedness may be empirically measured based, for example, on entropy of the distribution. Entropy of a distribution may be measured, for example, by the equation:

$$H(d) = -\Sigma(p_i \times \log p_i) \quad (4)$$

where:
H(d) represents the entropy of a distribution d;
$p_i$ represents the probability of a value i within the distribution d; and
the base of the logarithm is an appropriately selected value, e.g., 2 or e.

Where the entropy of a distribution is low, this can indicate that the checksum or hashing algorithm and parameters used to generate the distribution are likely to be the same or similar as that used to generate the historical network call parameter values. Conversely, where the entropy of a distribution is high, this can indicate that the checksum or hashing algorithm or parameters used to generate the distribution are unlikely to be similar as that used to generate the historical network call parameter values. For example, distribution 20 may indicate that the applied algorithm (illustratively a checksum algorithm, resulting in a single checksum value) and parameters are likely very similar to those used to generate historical parameter values, while distributions 22 and 24 may indicate that the applied algorithm is correct or largely correct, but the applied parameters differ slightly from those used to generate the historical values. Nevertheless, each of these distributions may be used to validate proposed network call parameter values. For example, in the case of distribution 20, a proposed network call parameter value may be processed through the same algorithm and values used to generate the distribution 20, and if the resulting checksum value is 0, the proposed value is very likely to be valid. Conversely, if the resulting checksum value proposed network call parameter value may be processed through the same algorithm and values used to generate the distribution 22, and the proposed value may be quite likely valid if the resulting checksum value is 7 or 8, somewhat less likely valid if the resulting checksum value is 6 or 9, and much less likely valid if the resulting checksum value is 0 through 5. Similar conclusions may be drawn from other distributions.

In one embodiment, a checksum or hashing algorithm and parameters (e.g., weights) are selected by applying a variety of algorithms and weights to a set of historical network call parameter values and associating with a set of historical values an algorithm and weights that generate a distribution having a minimum entropy. For example, distribution 20 may be selected from among the distributions 20-26 given the low entropy of that distribution 20. In some cases, the centralized network call validation system may set a maximum threshold entropy for a distribution, such that no distribution is selected if all distributions have an entropy over a given value.

While embodiments are described herein with reference to checksums of hashing digits, these embodiments may additionally or alternatively utilize other calculation of hash digits (e.g., a result of passing a proposed parameter value through other hashing algorithms). Thus, any reference to an embodiment involving checksums should be understood to be modifiable to additionally or alternatively utilize various hash techniques. For example, the probability models of checksums disclosed herein may be modified to a hash value probability model by applying one or more hashing algorithms to determine corresponding statistical distributions of resulting hash values. One or more such hash probability models (e.g., one with a least entropic distribution) may then be used to validate proposed network call parameter values, in a manner similar to the checksum-based hashing probability models disclosed herein.

In some embodiments, the validity probabilities calculated based on number pattern probabilities and probabilities of hashing digit checksum may be used in combination. For example, the centralized network call parameter validation system may calculate an expected validity based on both probabilities and probabilities of hashing digit checksum and select the higher of the two probabilities to use to set a validation response. As another example, the centralized network call parameter validation system may calculate an expected validity based on both number pattern probabilities and probabilities of hashing digit checksum and add together the two probabilities (e.g., using a weighted linear combination) to set a combined probability used to set a validation response.

As noted above, the calculated validity result can then be used to control submission of network calls within a distributed system. For example, proposed network calls whose parameters have a negative or low validity result may be rejected, while proposed network calls whose parameters have a high or positive validity result may be accepted. Accordingly, mistaken or fraudulent proposals may be quickly identified without requiring that those proposals be attempted and without requiring confidential or private information of computing systems within the distributed network. This ability to quickly reject proposed network calls with malicious or malformed network call parameters can enable systems on the network to avoid delays associated with rejected proposals, particularly where computing systems that evaluate proposals have differing operational characteristics such as limited availability. Moreover, this ability to quickly reject such proposals can avoid detrimental effects of failed proposals, such as the blocking of future proposal submissions.

As will be appreciated by one of skill in the art in light of the present disclosure, the embodiments disclosed herein improve the ability of computing systems to quickly identify malformed or malicious network call proposals, including those associated with fraudulent behavior. Specifically, embodiments of the present disclosure apply probability analysis to network call parameter values in order to determine, independent of submission of such a network call, the likelihood that such a network call contains acceptable parameter values. Moreover, the presently disclosed embodiments address technical problems inherent within computing systems; specifically, the difficulty of preventing fraud and misuse on such networks, and the difficulties associated with disparate operational characteristics of computing systems in distributed networks, particularly in applying different evaluation criteria for proposed network calls. These technical problems are addressed by the various technical solutions described herein, including a centralized network call parameter validation system that utilizes statistical validity models, such as probabilities of data patterns, probabilities of hashing digit checksum, or a combination thereof to determine, independent of submission of a network call and independent of knowledge of the criteria a receiving system applies to validate such a network call, the validity of parameters to such a network call. Thus, the present disclosure represents an improvement in distributed network call system and computing systems in general.

The foregoing aspects and many of the attendant advantages of this disclosure will become more readily appreciated as the same become better understood by reference to the following description, when taken in conjunction with the accompanying drawings.

Figure 3:
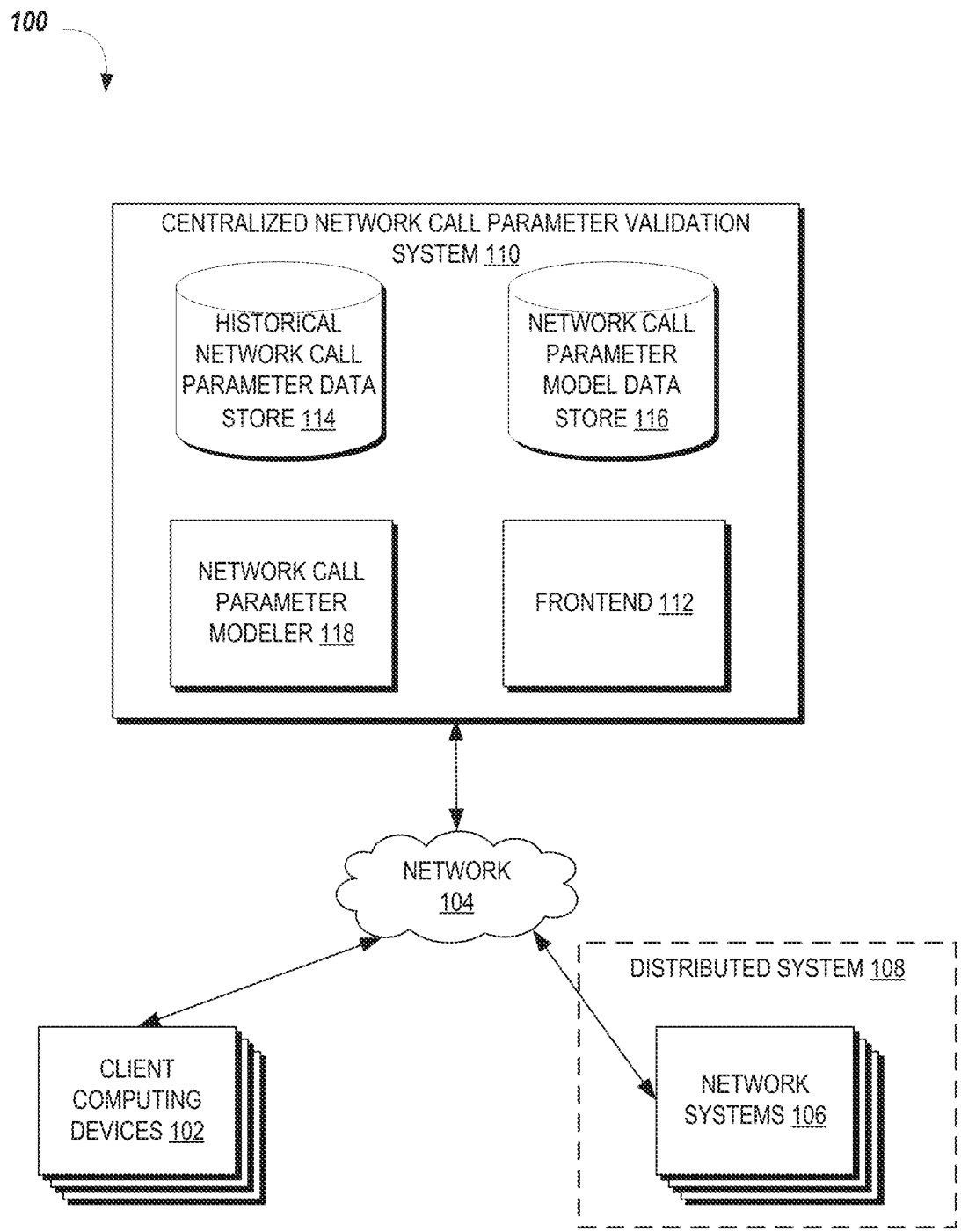
FIG. 3 depicts an example computing environment 100 including a centralized network call parameter validation system 110 in which embodiments of the present disclosure can be implemented to provide centralized validation of parameter values for network calls proposing data manipulations on a distributed network.

FIG. 3 depicts an example computing environment 100 including a centralized network call parameter validation system 110 in which embodiments of the present disclosure can be implemented. Illustratively, the centralized network call parameter validation system 110 can represent a network-accessible system providing for validating parameters of network call including proposed data manipulations on a distributed system 108 independent of submitting the network calls to the system 108.

The distributed system 108 can include a distributed set of network systems 106, each representing one or more computing devices configured to receive and evaluate network calls included proposed data manipulations, in some cases referred to as transactions. As used herein, the term "transaction" includes any interaction that modifies a state of a destination network call system 106. For example, transactions may include modifications to a database or other information store. Transactions on the system 108 may conform to a shared protocol or format, such that the individual systems 106 can interact on the distributed system 108. As noted above, each system 106 may apply criteria to determine whether to accept or reject a transaction, which criteria may be system-local (e.g., not shared among all individual systems 106 on the distributed system 108). This criteria may not be exposed externally to the system 106, and in some cases systems 106 may not provide for validation of transactions independently of attempting a transaction. Moreover, systems 106 may apply security measures to prevent misuse of the distributed system 108, such as blocking subsequent transaction submissions from a client computing device 102 (or associated devices 102) that repeatedly submits rejected transactions. As noted above, network call systems 106 may have varying operational characteristics, such as availability. For example, some systems 106 may support real-time processing of proposed transactions, while other systems 106 may not support such real-time processing, or may only partially support real-time processing (e.g., during specific hours). Accordingly, while the distributed system 108 may function to process transactions, it may be difficult to provide for real-time validation of such transactions or to avoid negative ramifications associated with submission of fraudulent or mistaken transactions.

Embodiments of the present disclosure address these problems by providing for a centralized network call parameter validation system 110 supporting centralized validation of proposed network call parameters independent of submission of such a network call on the system 108. In one embodiment, the centralized network call parameter validation system 110 may provide for real-time validation of such parameters, thereby providing consistent operational speed relative to the distributed system 108. As discussed in more detail below, the centralized network call parameter validation system 110 may conduct validation based on application of one or more statistical validity models generated from analysis of historical network call parameters, such as by validating a proposed parameter value based on probabilities of symbols (e.g., conditional probabilities) in the value, based on a checksum of the value, or a combination thereof.

The centralized network call parameter validation system 110 can illustratively be accessed by client computing devices 102 over a network 104. Client computing devices 102 can include any network-equipped computing device, for example desktop computers, laptops, smartphones, tablets, e-readers, set top boxes, virtual reality headsets, gaming consoles, and the like. The network 104 can include any appropriate network, including an intranet, the Internet, a cellular network, a local area network or any other such network or combination thereof. In FIG. 3, the network 104 is the Internet. Protocols and components for communicating via the Internet or any of the other aforementioned types of communication networks are known to those skilled in the art of computer communications and thus, need not be described in more detail herein.

Client computing devices 102 may be associated with an entity submitting network calls to the distributed system 106. In one embodiment, devices 102 are operated by third parties not associated with the distributed system 108. In another embodiment, devices 102 are operated by entities also providing a network system 106 of the distributed system 108.

As noted above, the centralized network call parameter validation system 110 can support centralized validation of proposed network call parameters independent of submission of such a network call on the system 108. Accordingly, the centralized network call parameter validation system 110 can include multiple elements, which may represent distinct computing devices or logic executed on a single computing device, facilitating such functionality. For example, the centralized network call parameter validation system 110 includes a frontend 112 enabling client computing devices 102 to submit proposed network call parameter values to the validation system 110. The frontend 112 may provide various interfaces to client computing devices 102, such as graphical user interfaces (GUIs), command line interfaces (CLIs), application programming interfaces (APIs), and the like. For example, the frontend 112 may include a web server hosting web pages that facilitate the above-noted operations or an API server enabling programmatic invocation of the above-noted operations.

To support validation of proposed network call parameter values, the centralized network call parameter validation system 110 includes a historical network call parameter data store 114. The data store 114 can correspond to any persistent or substantially persistent data store, such as a hard disk drive, solid state drive, or the like, or multiple such drives logically combined (e.g., as a distributed network system).

The data store 114 can include a set of historical network call parameter values, which can support statistical analysis of subsequent values for such parameters. For example, the data store 114 may include a set of valid values for a given parameter, or a set of valid combinations of values for different parameters. In one embodiment, the values within the store 114 are presumed valid (though embodiments of the present disclosure may function even when some number of invalid values are present). In another embodiment, the values within the store 114 are labeled as valid or invalid. In one embodiment, all data within the store 114 corresponds to a specific parameter or combination of parameters. In another embodiment, the data within the store 114 can correspond to different parameters. The number of values within the store 114 can be sufficiently large to enable accurate statistical evaluation of proposed network call parameter values, which in some cases can include thousands or millions of values.

The centralized network call parameter validation system 110 further includes a network call parameter modeler 118 configured to generate one or more statistical validity models for a parameter based on values for that parameter within the data store 114. Generation of statistical models is discussed in more detail below, but in brief the network call parameter modeler 118 may analyze values in the store 114 to generate data pattern probability models (e.g., conditional probability models), hashing digit checksum models, or combinations thereof for a parameter or combination of parameters. The models may then be stored in the network call parameter model data store 116, which can correspond to any persistent or substantially persistent data store, such as a hard disk drive, solid state drive, or the like, or multiple such drives logically combined (e.g., as a distributed network system). These models may then be used to evaluate subsequent proposed parameter values to determine a likelihood that such proposed value would be considered valid if submitted to a network system 106. For example, a client computing device 102 may submit a proposed value (or multiple values) to the frontend 112, which may reference the models in the data store 116 to determine likelihood of validity of the proposed values and return a validation response indicating, for example, that the value is likely valid or likely invalid. In practice, models generated in accordance with embodiments of the present disclosure can provide for very high confidence of valid parameter values, even without explicit knowledge of the criteria applied by the systems 106 to evaluate network call parameter values. For example, models generated according to embodiments disclosed herein may achieve accuracies of greater than 97%, 98%, 99% or higher for certain parameters.

The centralized network call parameter validation system 110 is depicted in FIG. 3 as operating in a distributed computing environment including several computer systems that are interconnected using one or more computer networks (not shown in FIG. 3). The centralized network call parameter validation system 110 can also operate within a computing environment having a fewer or greater number of devices than are illustrated in FIG. 3. Thus, the depiction of the centralized network call parameter validation system 110 in FIG. 3 should be taken as illustrative and not limiting to the present disclosure. For example, the centralized network call parameter validation system 110 or various constituents thereof could implement various Web services components, hosted or "cloud" computing environments, and/or peer to peer network configurations to implement at least a portion of the processes described herein. Moreover, the environment 100 may include additional elements not shown in FIG. 3.

Further, the centralized network call parameter validation system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

Figure 4:
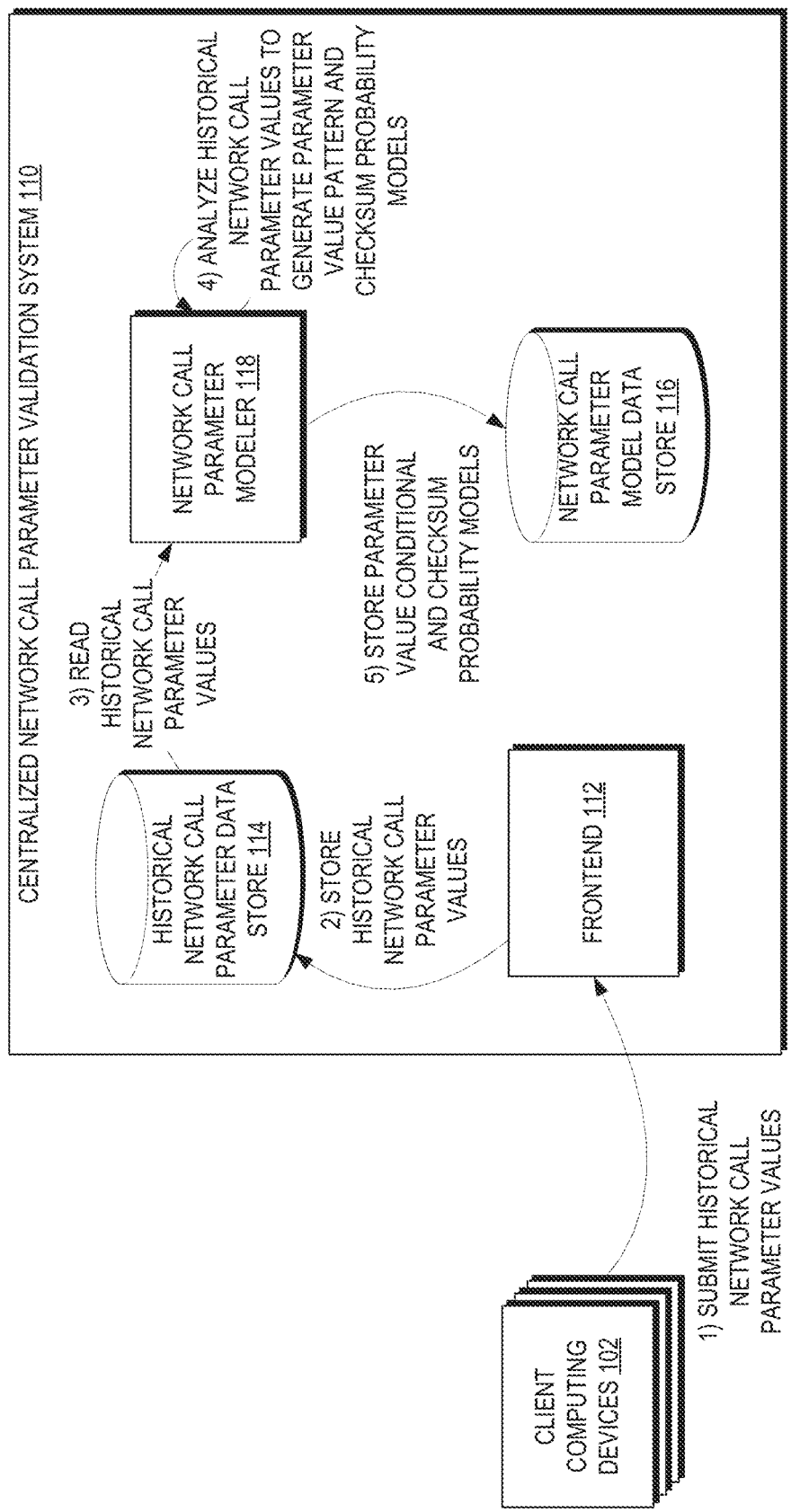
FIG. 4 depicts illustrative interactions for generation of a conditional number pattern probability model and hashing digit checksum probability model for a network call parameter.
Figure 5:
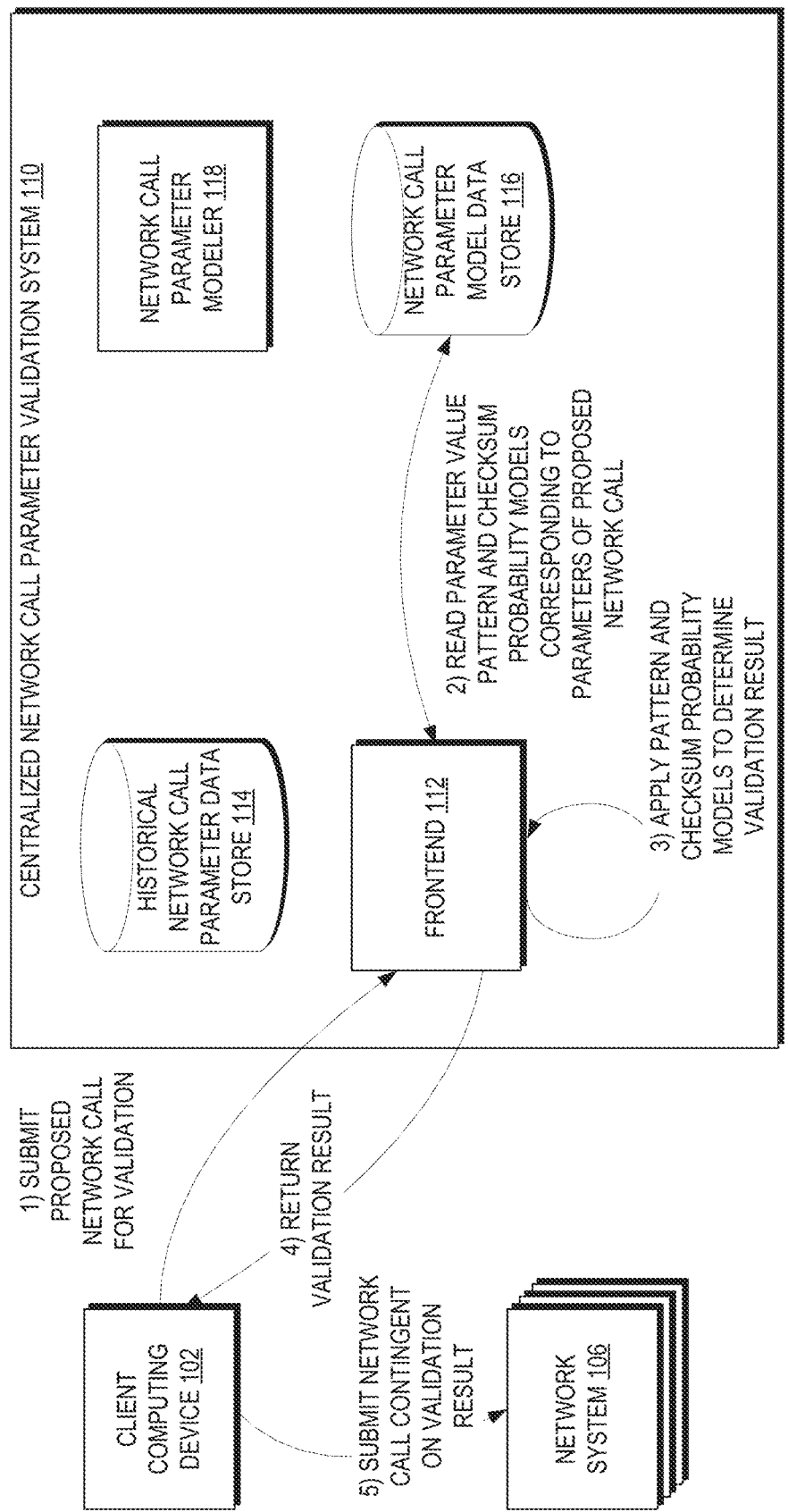
FIG. 5 depicts illustrative interactions for the use of a conditional number pattern probability model and hashing digit checksum probability model for a network call parameter to validate a proposed value for such a parameter.

With reference to FIGS. 4 and 5, illustrative interactions relating to operation of the centralized network call parameter validation system 110 will be described. Specifically, FIG. 4 depicts illustrative interactions for generation of a conditional number pattern probability model and hashing digit checksum probability model for a network call parameter, while FIG. 5 depicts illustrative interactions for the use of a conditional number pattern probability model and hashing digit checksum probability model for a network call parameter to validate a proposed value for such a parameter. While FIGS. 4 and 5 are described with respect to conditional number pattern probability models, similar interactions may be used to generate and use other probability models, including unconditional probability models. Similarly, while these figures are described with respect to checksum probability models, similar interactions may be used to generate and use probability models for other hashing values.

With reference to FIG. 4, the interactions begin at (1), where client computing devices 102 submit historical network call parameter values to the frontend 112. The frontend 112, in turn, stores the values within the data store 114 at (2). Illustratively, client computing devices 102 may have previously submitted network calls to the distributed system 108, and thus have access to parameter values for such network calls, which they may submit at interaction (1). In one embodiment, the client computing devices 102 may filter the submitted values such that only values for network calls corresponding to accepted proposals are included. In another embodiment, the client computing devices 102 may label network call parameter values to indicate whether a specific data manipulation associated with the parameter values was accepted. While FIG. 4 depicts obtaining network call parameter values from client computing devices 102, the centralized network call parameter validation system 110 may obtain historical network call parameters from additional or alternative sources.

At (3), the network call parameter modeler 118 reads the historical network call parameter values from the data store 114 and, at (4), analyzes the historical network call parameter values to generate probability models for a parameter or combination of parameters.

In one embodiment, the models include a model of conditional probability for individual symbols within a parameter value, based on other symbols within the value. For example, the model may include a probability of each subsequent digit within a numerical value based on other digits (e.g., the probability that a valid number includes a '2' followed by a '1', a '7' followed by a '4', etc.). These may be referred to as "conditional" probabilities, as they establish the probability of one symbol at a particular position given the probability of another symbol at another position. Because the probabilities relate to positional symbols within a value, they may also be referred to as "transitional" probabilities. The probabilities may relate to consecutive symbols, non-consecutive symbols, or various combinations of symbols. In one embodiment, the probabilities may be represented as a Sankey diagram, such as those discussed with reference to FIG. 1, above. Illustratively, the network call parameter modeler 118 may generate the probabilities based on an aggregate of all the historical values for a parameter within the data store 114. In other embodiments, the network call parameter modeler 118 may generate probabilities based on a subset of historical values for the parameter, such as those matching specific criteria. Illustratively, the network call parameter modeler 118 may segregate values for a parameter based on characteristics of the parameter values such as length, building a conditional probability model for each potential length of the parameter. The network call parameter modeler 118 may further generate statistical probabilities for such characteristics, indicating for example, the probability that a parameter value will be of a given length. In some embodiments, the network call parameter modeler 118 may initially generate conditional probabilities for each position within a network parameter (e.g., the probability of each symbol given a prior symbol), and subsequently generated conditional probabilities for only selected positions (e.g., the probability of each symbol in a first selected position, and the probability of each symbol in each subsequent selected position given possible symbols in a prior position of the selected positions). For example, the positions may be selected based on entropy, such that positions with less than a threshold entropy are selected. Accordingly, if a parameter shows strong patterns in the first, third, and eighth positions for example, the conditional probabilities may indicate probabilities for the first position, probabilities for the third position given possible symbols in the first position, and probabilities for the eighth position given possible symbols in the third position. Generating a model of conditional probabilities for selected positions may reduce the information needed to represent the model while simultaneously increasing a speed of evaluating proposed values against the model. Moreover, selecting those positions based on factors such as entropy may enable this increased speed and reduced information without loss of accuracy of the model.

In addition or alternatively to conditional number pattern probability models, the network call parameter modeler 118 can generate a checksum model for a particular parameter. As noted above, some network call values may include or be associated with checksum values, which the network systems 106 may apply to validate the parameters. The particular checksum algorithm—and parameters for such an algorithm, such as weights used to calculate the checksum value—may be proprietary to individual systems 106 or otherwise confidential. However, the network call parameter modeler 118 may utilize values within the historical network call parameter data store 114 to statistically validate values based on potential checksums. Illustratively, the network call parameter modeler 118 may maintain a set of potential checksum algorithm instances, each representing a given combination of algorithm and parameters. Each instance may be associated with an expected value, which may be fixed (e.g., 0) or dynamic (e.g., indicated by a position within a valid parameter value, such as a last position in a number). The network call parameter modeler 118 can then apply each potential checksum algorithm instance to values within the data store 114, and for each potential checksum algorithm instance, determine a statistical distribution of resulting checksum values versus the expected value or values. Examples of such distributions are shown in FIG. 2, as discussed above. The network call parameter modeler 118 may then select a checksum algorithm instance from the set based on the statistical distribution for that set. For example, the modeler 118 may select a distribution with the lowest entropy relative to other distributions for other potential checksum algorithm instances.

In one embodiment, the models built by the network call parameter modeler 118 are particular to certain combinations of network call parameters. For example, where network calls include two parameters, the network call parameter modeler 118 may generate one or more models indicating probable values of the second parameter for each possible value of the first parameter.

Subsequently, the models may be stored in the network call parameter model data store 116. As discussed herein, the models may subsequently be used to facilitate validation of proposed network call parameter values, e.g., according to equations (1) through (3), above for conditional number pattern probability models, equation (4) for checksum probability models, or a combination thereof.

In some embodiments, the interactions of FIG. 4 may be repeated at one or more later times to update the models. For example, client computing devices 102 may periodically or continuously submit additional historical network call parameter values to the system 110, and the interactions of FIG. 4 may be repeated (e.g., periodically or continuously) to update the models based on the additional interactions. In this manner, the models may be refined over time to provide for still more accurate validation.

With reference to FIG. 5, illustrative interactions will be described for the use of a conditional number pattern probability model and checksum probability model for a network call parameter to validate a proposed value for such a parameter. The interactions begin at (1), where a client computing device 102 submits to the frontend 112 a proposed network call (or parameter values for such a network call). Illustratively, an end user of the client computing device 102 may desire to submit the network call to the distributed system 108 and wish to validate the network call prior to submission. As noted above, such validation independent of submission can solve a number of problems, including inability of the distributed system 108 to provide consistent real-time validation, inability of the distributed system 108 to validate network call independent of actually processing data manipulations proposed by such network call, and negative implications for submitting invalid or rejected network calls, which may for example be associated with mistake or fraud. The system 110 may thus enable validation independent of submitting these network call, thereby providing for example real-time, transaction-independent validation and detection of mistakes or fraud.

Thereafter, at (2), the frontend reads probability models for the proposed network call from the network call parameter model data store 116. In some cases, the model may be generic to all network calls. In other cases, models may be specific to particular network call, such as network call having a first parameter value and including a second value to be validated. In FIG. 5, the models illustratively include both a conditional number pattern probability model and a checksum probability model. In other interactions, one of a conditional number pattern probability model and a checksum probability model may be used.

At (3), the frontend 112 applies the probability models to the parameter values of the proposed network call in order to determine a validation result. Illustratively, the frontend 112 may apply equation (3) (e.g., as shown above or as modified in the possible manners described above, such as by including a probability of the value being a certain length according, by weighting the conditional number pattern probabilities according to an inverse of entropy for symbols at a given position, etc.) to determine a probability that the symbol pattern in a parameter value is a valid pattern. Accordingly, where the parameter value includes a symbol pattern that is common or statistically likely within historical parameters, the frontend 112 may calculate that the value is valid with a high probability. Conversely, where the parameter value includes a symbol pattern that is uncommon or statistically unlikely within historical parameters, the frontend 112 may calculate that the value is invalid with a high probability. Further, the frontend 112 may apply a checksum algorithm instance to the proposed value to determine a deviation between the result of that algorithm instance and an expected result for the proposed value and compare that deviation to the checksum probability model for the parameter. The applied checksum algorithm instance may be the same instance as applied to generate the checksum probability model—e.g., the instance that when applied to parameter values of historical network calls results in a probability model with a relatively low entropy as compared to other instances. For example, where the checksum algorithm instance when applied to parameter values of historical network calls results in deviations of a certain value (e.g., 0) and also results in that value when applied to the parameter value of the proposed network call, the proposed network call parameter may be considered likely valid. Illustratively, the validity probability according to the checksum model may be calculated as in equation (4), above.

The frontend 112 may then determine a validation result based on the probability given by the conditional number pattern probability model, the probability given by the checksum probability model, or a combination thereof. In some embodiments, the frontend 112 may select a higher of the two probabilities given by application of the respective models as an overall probability. In other embodiments, the frontend 112 may combine the two probabilities, such by weighted linear combination, to result in an overall probability of validity. The validation result may in some cases be the overall probability—for example, validation result may indicate a given percentage probability that the data manipulation proposed in the network call will be accepted if submitted to the network system 106. In other cases, the validation result may be binary, such as a "valid" or "invalid" indicator, based on whether the overall probability exceeds a threshold. For example, the frontend 112 may be configured with a threshold such that probabilities above the threshold result in a "valid" indicator while probabilities below the threshold result in an "invalid" indicator. In accordance with the high accuracy of the models disclosed herein, the threshold may be correspondingly high, for example, 97%, 98%, 99% or higher.

Thereafter, the frontend 112 returns the validation result to the client computing device 102, thus providing an indication independent of submitting the network call of whether the data manipulation proposed in the network call will be accepted by a system 106 of the distributed system 108. In one embodiment, the client computing device is configured to use the validation result to control submission of the network call, such that the network call is submitted only when the validation result is positive or indicates a data manipulation of the network call is valid with a threshold degree of certainty. Accordingly, the client computing device 102 can avoid submission of erroneous or fraudulent proposals. In some instances, the devices 102 may use the interactions of FIG. 5 to detect such proposals in real-time, even when a destination system 106 does not support such real-time validation.

In some embodiments, the frontend 112 is further configured to return to the client computing device 102 a suggested correction to the network call parameter values. For example, particular errors within parameter values may be highly likely to be a result of mistake, rather than fraud. Illustratively, transposition of two numbers in a value may be relatively common as a mistake, and relatively uncommon as attempted fraud. The frontend 112 may thus utilize the conditional number pattern probability model for a parameter value to detect such transpositions and indicate the transposition to the client computing device 102. Illustratively, the frontend 112 may determine from a conditional number pattern probability model one or more likely number patterns within valid parameter values and compare the likely patterns to the proposed value. If the proposed value is similar to a likely pattern except for transposition of two symbols, the frontend 112 may indicate that transposition to the client computing device 102 as a correction to the parameter value. Such functionality may illustratively act to correct mistaken network call parameter values and avoid failed proposals. While transposition is provided here as an example of such a mistake, others are possible.

Figure 6:
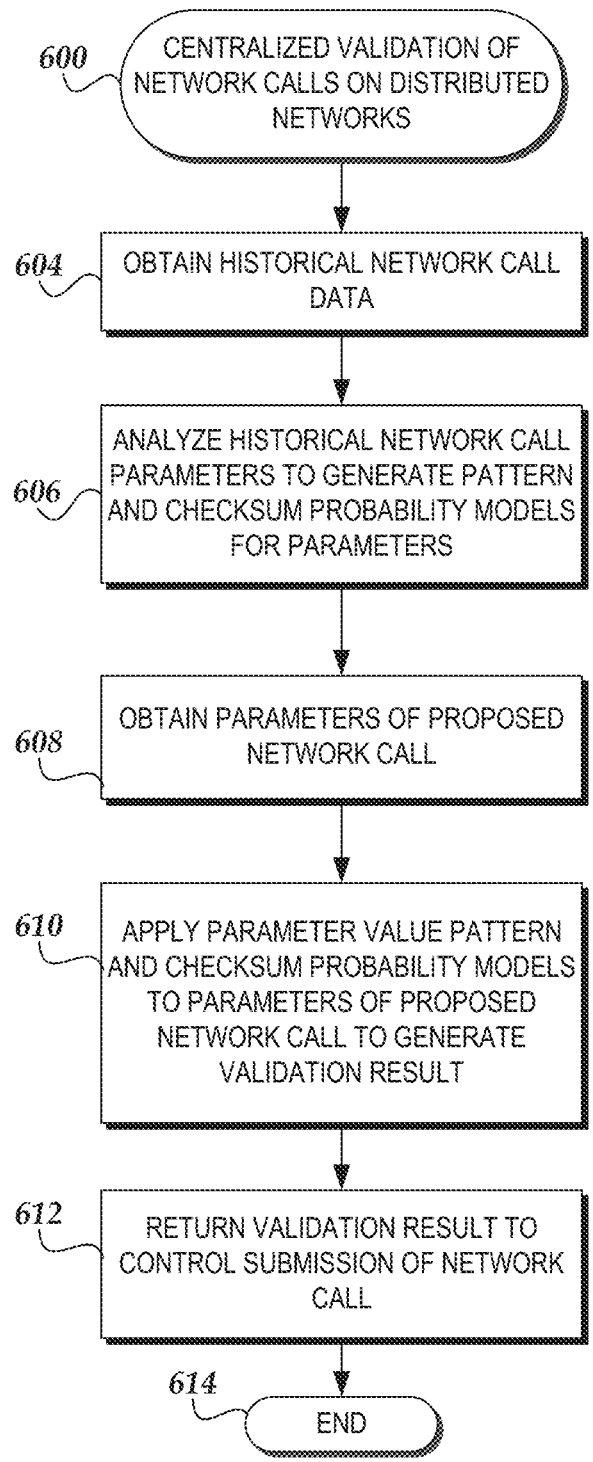
FIG. 6 depicts an illustrative routine for centralized validation of network calls on distributed networks.

With reference to FIG. 6, an illustrative routine 600 will be described for centralized validation of network calls on distributed networks. The routine 600 may be implemented, for example, by the centralized network call parameter validation system 110 of FIG. 3.

The routine 600 begins at block 604, where the centralized network call parameter validation system 110 obtains historical network call data. As discussed above, the historical network call data may include a set of network calls, which may be unlabeled or labeled with an indication of validity or invalidity. Each network call can include a set of parameters and associated values, such as fields to be modified in a data manipulation proposed via the call and values of such fields. In one embodiment, the proposals are database transactions that each include, for example, an account identifier for an end user whose account is to be modified via the transaction. Each network call may further include other identifiers, such an identifier of a particular network system 106 maintaining data of the account modified via the network call. For example, each network call may include a routing identifier that facilitates routing of the network call to a particular system 106. The historical network call data may illustratively be obtained from client computing devices 102 that submitted the network call to the distributed network.

At block 606, the centralized network call parameter validation system 110 analyzes the historical network call parameters to generate number pattern and checksum probability models for one or more network parameters. As noted above, the conditional number pattern probability model may generally indicate a probability that certain symbol patterns exist within a valid parameter value. The checksum probability model may generally indicate an expected deviation between a checksum calculated for a parameter value and an expected checksum result for the parameter value. Both the number pattern and checksum probability models may be generated based on an aggregate of historical network calls as obtained at block 604. In one embodiment, the models are generic across network calls. In another embodiment, the models are specific to a subset of network calls—e.g., determining probabilities of account identifier values given a specific routing identifier value. While FIG. 6 depicts generation of both number pattern and checksum probability models, in some embodiments the routine 600 may generate only a number pattern probability model or only a checksum probability model. Further discussion of the number pattern and checksum probability models is provided above with respect, e.g., to FIGS. 1, 2, and 4.

At block 608, the centralized network call parameter validation system 110 obtains parameters of a proposed network call. For example, an end user of a client computing device 102 may desire to submit a proposed data manipulation to the distributed system 108, and the client computing device 102 may be configured to validate the proposal prior to submission to avoid submission of a rejected proposal, which may be fraudulent or erroneous.

Accordingly, at block 610, the centralized network call parameter validation system 110 applies the conditional and checksum probability models to the parameter values of the proposed network call to generate a validation result. For example, the centralized network call parameter validation system 110 may determine a specific parameter value (e.g., routing identifier) within the proposed network call, and retrieve a model indicating probabilities of valid values for a second parameter (e.g., account identifier) given that specific parameter value. The centralized network call parameter validation system 110 may then determine a validation result based on the models. For example, the centralized network call parameter validation system 110 may utilize any one or more of equations (1) through (4) to determine an overall probability of validity for the network call parameters. As noted above, in one embodiment the centralized network call parameter validation system 110 utilizes a highest probability among those determined from both a number pattern and checksum probability model. In another embodiment the centralized network call parameter validation system 110 utilizes a combination of the probabilities determined from those two models. The validation result may illustratively match the determined overall probability (e.g., as a percentage of likely validity), or may be a binary indication of validity based on comparting the determined overall probability to a threshold. While FIG. 6 depicts use of both number pattern and checksum probability models, in some embodiments the routine 600 may apply only a number pattern probability model or only a checksum probability model at block 610. Moreover, while the routine 600 is discussed with respect to validation of a single parameter value within a proposed network call, embodiments of the routine 600 may validate values of multiple different parameters, e.g., by building any applying models to values of each such parameter.

At block 612, the centralized network call parameter validation system 110 returns the validation result to the client computing device 102. As noted above, the client computing device 102 may be configured to utilize the validation result to control submission of the network call to a distributed system 108, such as by declining to submit the network call when the validation result is negative or falls below a threshold level. Accordingly, the client computing device 102 can avoid submission of mistaken or fraudulent network call to the distributed system 108. As discussed above, in some embodiments centralized network call parameter validation system 110 can further determine a potential correction to the network call, such as an indicator that two symbols within a parameter value have been transposed. In such embodiments, the centralized network call parameter validation system 110 may additionally return the potential correct to the client computing device 102, e.g., such that an end user can apply the correction to correct the network call.

Figure 7:
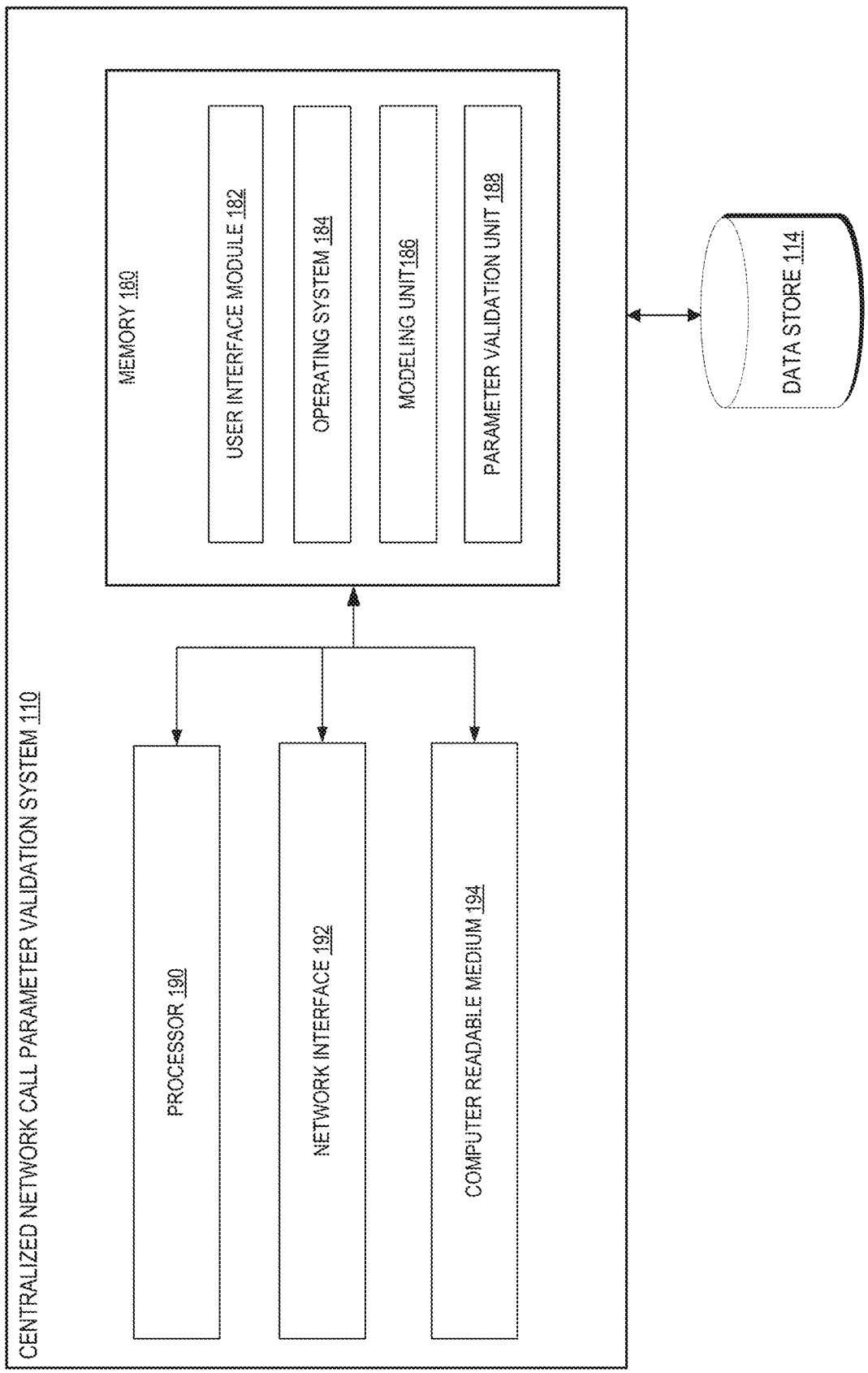
FIG. 7 depicts an example architecture of a computing that can be used to perform one or more of the techniques described herein or illustrated in FIGS. 1-6.

FIG. 7 depicts an example architecture of a computing system (referred to as the centralized network call parameter validation system 110) that can be used to perform one or more of the techniques described herein or illustrated in FIGS. 1-6. The general architecture of the centralized network call parameter validation system 110 depicted in FIG. 7 includes an arrangement of computer hardware and software modules that may be used to implement one or more aspects of the present disclosure. The centralized network call parameter validation system 110 may include many more (or fewer) elements than those shown in FIG. 7. It is not necessary, however, that all of these elements be shown in order to provide an enabling disclosure. As illustrated, the centralized network call parameter validation system 110 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 2.

The processor 190 may also communicate with memory 180. The memory 180 may contain computer program instructions (grouped as modules or units in some embodiments) that the processor 190 executes in order to implement one or more aspects of the present disclosure. The memory 180 may include random access memory (RAM), read only memory (ROM), and/or other persistent, auxiliary, or non-transitory computer-readable media. The memory 180 may store an operating system 184 that provides computer program instructions for use by the processor 190 in the general administration and operation of the centralized network call parameter validation system 110. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device.

In addition to and/or in combination with the user interface module 182, the memory 180 may include a modeling unit 186 and a parameter validation unit 188. In one embodiment, the modeling unit 186 and parameter validation unit 188 when executed implement various aspects of the present disclosure, e.g., generating probability models for network call parameters, validating proposed network call parameters according to such models, and/or other aspects discussed herein or illustrated in FIGS. 1-6. Illustratively, the modeling unit 186 may include code corresponding to the network call parameter modeler 118 and the parameter validation unit 188 may contain code corresponding to the frontend 112.

While modeling unit 186 and parameter validation unit 188 are shown in FIG. 7 part of the centralized network call parameter validation system 110, in other embodiments, all or a portion of the modeling unit 186 and parameter validation unit 188 may be implemented by another computing device. For example, in certain embodiments of the present disclosure, another computing device in communication with the centralized network call parameter validation system 110 may include several modules or components that operate similarly to the modules and components illustrated as part of the centralized network call parameter validation system 110. In some instances, the modeling unit 186 and parameter validation unit 188 may be implemented as one or more virtualized computing devices. Moreover, the modeling unit 186 and parameter validation unit 188 may be implemented in whole or part as a distributed computing system including a collection of devices that collectively implement the functions discussed herein.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
    a data store storing data identifying values of a parameter in prior network calls on a network; and
    one or more processors with computer-executable instructions to:
        generate, from the values of the parameter in the prior network calls, a statistical validity model for the parameter that models a likelihood of one or more symbols occurring in an individual valid value for the parameter based at least in part on a likelihood of an individual symbol occurring at a specific position within the individual valid value;
        obtain, from a computing device, a proposed value for the parameter of a proposed network call on the network;
        apply the statistical validity model for the parameter to the proposed value to determine a likelihood that the proposed value is valid; and
        return to the computing device a validation result indicating the likelihood that the proposed value is valid, wherein the computing device is configured to control submission of the proposed network call to the network according to the likelihood that the proposed value is valid.

2. The system of claim 1, wherein the validation result is at least one of the determined likelihood that the proposed value is valid or a binary validity indicator, wherein the binary validity indicator is positive only if the determined likelihood that the proposed value is valid exceeds a threshold amount.

3. The system of claim 1, wherein the statistical validity model models a probability distribution of symbols occurring in a first position of a set of positions in the valid values of the parameter and a probability distribution of symbols occurring in each subsequent position of the set of positions conditional on a symbol in a prior position of the set of positions.

4. The system of claim 3, wherein the set of positions are selected by:
    generating a probability distribution for each possible position within a set of possible positions for the valid values; and
    selecting the set of positions as a subset of the set of possible positions, the subset selected based on entropy values for the probability distributions of possible positions within the subset.

5. The system of claim 4, wherein the subset is selected to minimize entropy values for the probability distributions of possible positions within the subset.

6. The system of claim 3, wherein to apply the statistical validity model for the parameter to the proposed value to determine the likelihood that the proposed value is valid, the one or more processors:
determine a probability that a symbol of the proposed value at the first position occurs at the first position within the valid values; and
for each subsequent position of the set of positions, determine a probability that a symbol of the proposed value at the subsequent position occurs at the subsequent position within the valid values conditional on a symbol in a prior position of the set of positions;
wherein the likelihood that the proposed value is valid is calculated based on a product of the probability that the symbol of the proposed value at the first position occurs at the first position within the valid values and the probability that the symbol of the proposed value at each subsequent position occurs at each subsequent position within the valid values.

7. The system of claim 1, wherein the determined likelihood that the proposed value is valid is a first likelihood, wherein the one or more processors further:
generate, from the data identifying values of the parameter in the prior network calls, a checksum probability model for the parameter, the checksum probability model modeling a deviation between a result of applying a checksum algorithm to values of the parameter in the prior network calls and an expected result of the checksum algorithm when applied to the values of the parameter in the prior network calls; and
apply the checksum probability model for the parameter to the proposed value to determine a second likelihood that the proposed value is valid; and
wherein the validation result is based on a combination of the first and second likelihoods.

8. The system of claim 7, wherein the one or more processors determine the checksum algorithm from a set of potential checksum algorithms by:
applying each potential checksum algorithm of the set of potential checksum algorithms to the values of the parameter in the prior network calls to determine, for each potential checksum algorithm, a probability distribution for a deviation between a result of applying the potential checksum algorithm to values of the parameter in the prior network calls and an expected result of the potential checksum algorithm when applied to the values of the parameter in the prior network calls; and
selecting a potential checksum algorithm from the set of potential checksum algorithms as the checksum algorithm based on an entropy of the probability distribution of the selected potential checksum algorithm.

9. The system of claim 8, wherein the checksum algorithm is associated with a set of weight values, and wherein the one or more processors determine the set of weight values by:
applying the checksum algorithm with each potential set of weight values from multiple potential sets of weight values to the values of the parameter in the prior network calls to determine, for each potential set of weight values, a probability distribution for a deviation between a result of applying the checksum algorithm with the set of weight values to values of the parameter in the prior network calls and an expected result of the checksum algorithm with the set of weight values when applied to the values of the parameter in the prior network calls; and selecting a potential set of weight values from multiple potential sets of weight values as the set of weight values based on an entropy of the probability distribution for the potential set of weight values.

10. A computer-implemented method comprising:
generating, from values of a parameter in prior network calls on a network, a statistical validity model for the parameter that models a likelihood of one or more symbols occurring in an individual valid value for the parameter based at least in part on a likelihood of an individual symbol occurring at a specific position within the individual valid value;
obtaining, from a computing device, a proposed value for the parameter of a proposed network call on the network;
applying the statistical validity model for the parameter to the proposed value to determine a likelihood that the proposed value is valid; and
returning to the computing device a validation result indicating the likelihood that the proposed value is valid, wherein the computing device is configured to control submission of the proposed network call to the network according to the likelihood that the proposed value is valid.

11. The computer-implemented method of claim 10, wherein the statistical validity model models a probability distribution of symbols occurring in a first position of a set of positions in the valid values of the parameter and a probability distribution of symbols occurring in each subsequent position of the set of positions conditional on a symbol in a prior position of the set of positions.

12. The computer-implemented method of claim 11, wherein the set of positions are selected by:
generating a probability distribution for each possible position within a set of possible positions for the valid values; and
selecting the set of positions as a subset of the set of possible positions, the subset selected based on entropy values for the probability distributions of possible positions within the subset.

13. The computer-implemented method of claim 12, wherein the subset is selected to minimize entropy values for the probability distributions of possible positions within the subset.

14. The computer-implemented method of claim 11, wherein applying the statistical validity model for the parameter to the proposed value to determine the likelihood that the proposed value is valid comprises:
determining a probability that a symbol of the proposed value at the first position occurs at the first position within the valid values; and
for each subsequent position of the set of positions, determining a probability that a symbol of the proposed value at the subsequent position occurs at the subsequent position within the valid values conditional on a symbol in a prior position of the set of positions;
wherein the likelihood that the proposed value is valid is calculated based on a product of the probability that the symbol of the proposed value at the first position occurs at the first position within the valid values and the probability that the symbol of the proposed value at each subsequent position occurs at each subsequent position within the valid values.

15. The computer-implemented method of claim 10, wherein the determined likelihood that the proposed value is valid is a first likelihood, wherein the computer-implemented method further comprises:

generating, from the values of the parameter in the prior network calls, a checksum probability model for the parameter, the checksum probability model modeling a deviation between a result of applying a checksum algorithm to values of the parameter in the prior network calls and an expected result of the checksum algorithm when applied to the values of the parameter in the prior network calls; and applying the checksum probability model for the parameter to the proposed value to determine a second likelihood that the proposed value is valid; and wherein the validation result is based on a combination of the first and second likelihoods.

16. The computer-implemented method of claim 15, further comprising determining the checksum algorithm from a set of potential checksum algorithms by:

applying each potential checksum algorithm of the set of potential checksum algorithms to the values of the parameter in the prior network calls to determine, for each potential checksum algorithm, a probability distribution for a deviation between a result of applying the potential checksum algorithm to values of the parameter in the prior network calls and an expected result of the potential checksum algorithm when applied to the values of the parameter in the prior network calls; and selecting a potential checksum algorithm from the set of potential checksum algorithms as the checksum algorithm based on an entropy of the probability distribution of the selected potential checksum algorithm.

17. The computer-implemented method of claim 16, wherein the checksum algorithm is associated with a set of weight values, and wherein the method further comprises determining the set of weight values by:

applying the checksum algorithm with each potential set of weight values from multiple potential sets of weight values to the values of the parameter in the prior network calls to determine, for each potential set of weight values, a probability distribution for a deviation between a result of applying the checksum algorithm with the set of weight values to values of the parameter in the prior network calls and an expected result of the checksum algorithm with the set of weight values when applied to the values of the parameter in the prior network calls; and selecting a potential set of weight values from multiple potential sets of weight values as the set of weight values based on an entropy of the probability distribution for the potential set of weight values.

18. One or more non-transitory computer-readable media comprising computer executable instructions that, when executed by a computing system comprising a processor, cause the computing system to:

generate, from values of a parameter in prior network calls on a network, a statistical validity model for the parameter that models a likelihood of one or more symbols occurring in an individual valid value for the parameter based at least in part on a likelihood of an individual symbol occurring at a specific position within the individual valid value;

obtain, from a computing device, a proposed value for the parameter of a proposed network call on the network;

apply the statistical validity model for the parameter to the proposed value to determine a likelihood that the proposed value is valid; and return to the computing device a validation result indicating the likelihood that the proposed value is valid, wherein the computing device is configured to control submission of the proposed network call to the network according to the likelihood that the proposed value is valid.

19. The one or more non-transitory computer-readable media of claim 18, wherein the statistical validity model models a probability distribution of symbols occurring in a first position of a set of positions in the valid values of the parameter and a probability distribution of symbols occurring in each subsequent position of the set of positions conditional on a symbol in a prior position of the set of positions.

20. The one or more non-transitory computer-readable media of claim 19, wherein the computer executable instructions cause the computing system to select the set of positions by:

generating a probability distribution for each possible position within a set of possible positions for the valid values; and selecting the set of positions as a subset of the set of possible positions, the subset selected based on entropy values for the probability distributions of possible positions within the subset.

21. The one or more non-transitory computer-readable media of claim 20, wherein the subset is selected to minimize entropy values for the probability distributions of possible positions within the subset.

22. The one or more non-transitory computer-readable media of claim 19, wherein applying the statistical validity model for the parameter to the proposed value to determine the likelihood that the proposed value is valid comprises:

determining a probability that a symbol of the proposed value at the first position occurs at the first position within the valid values; and for each subsequent position of the set of positions, determining a probability that a symbol of the proposed value at the subsequent position occurs at the subsequent position within the valid values conditional on a symbol in a prior position of the set of positions;

wherein the likelihood that the proposed value is valid is calculated based on a product of the probability that the symbol of the proposed value at the first position occurs at the first position within the valid values and the probability that the symbol of the proposed value at each subsequent position occurs at each subsequent position within the valid values.

23. The one or more non-transitory computer-readable media of claim 18, wherein the determined likelihood that the proposed value is valid is a first likelihood, wherein the computer executable instructions that further cause the computing system to:

generate, from the values of the parameter in the prior network calls, a checksum probability model for the parameter, the checksum probability model modeling a deviation between a result of applying a checksum algorithm to values of the parameter in the prior network calls and an expected result of the checksum algorithm when applied to the values of the parameter in the prior network calls; and apply the checksum probability model for the parameter to the proposed value to determine a second likelihood that the proposed value is valid; and wherein the validation result is based on a combination of the first and second likelihoods.

24. The one or more non-transitory computer-readable media of claim 23, wherein the computer executable instructions that further cause the computing system to determine the checksum algorithm from a set of potential checksum algorithms by:
 applying each potential checksum algorithm of the set of potential checksum algorithms to the values of the parameter in the prior network calls to determine, for each potential checksum algorithm, a probability distribution for a deviation between a result of applying the potential checksum algorithm to values of the parameter in the prior network calls and an expected result of the potential checksum algorithm when applied to the values of the parameter in the prior network calls; and
 selecting a potential checksum algorithm from the set of potential checksum algorithms as the checksum algorithm based on an entropy of the probability distribution of the selected potential checksum algorithm.

25. The one or more non-transitory computer-readable media of claim 24, wherein the checksum algorithm is associated with a set of weight values, and wherein the computer executable instructions that further cause the computing system to determine the set of weight values by:
 applying the checksum algorithm with each potential set of weight values from multiple potential sets of weight values to the values of the parameter in the prior network calls to determine, for each potential set of weight values, a probability distribution for a deviation between a result of applying the checksum algorithm with the set of weight values to values of the parameter in the prior network calls and an expected result of the checksum algorithm with the set of weight values when applied to the values of the parameter in the prior network calls; and
 selecting a potential set of weight values from multiple potential sets of weight values as the set of weight values based on an entropy of the probability distribution for the potential set of weight values.

* * * * *